United States Patent [19]

Kasahara et al.

[11] 4,339,376
[45] Jul. 13, 1982

[54] HIGHLY HEAT-RESISTANT THERMOPLASTIC RESIN COMPOSITION HAVING HIGH OIL-RESISTANCE

[75] Inventors: Hideo Kasahara, Yokohama; Kunio Fukuda, Chigasaki; Hiroshi Suzuki, Tokyo, all of Japan

[73] Assignee: Asahi-Dow Limited, Tokyo, Japan

[21] Appl. No.: 287,685

[22] Filed: Jul. 28, 1981

[30] Foreign Application Priority Data

Aug. 13, 1980 [JP] Japan .............................. 55/110360
Oct. 8, 1980 [JP] Japan .............................. 55/139947

[51] Int. Cl.³ ....................... C08L 71/04; C08L 77/00
[52] U.S. Cl. ................................... 524/116; 524/504; 524/505; 524/508; 525/66; 525/92; 525/133
[58] Field of Search ............... 525/66, 92, 133, 905; 260/42.18, 42.17, 45.7 P, 45.8 R

[56] References Cited

U.S. PATENT DOCUMENTS

| | | | |
|---|---|---|---|
| 3,379,792 | 4/1968 | Finholt | 525/397 |
| 3,383,435 | 5/1968 | Cizek | 260/874 |
| 3,966,839 | 6/1976 | Sims | 260/857 UN |
| 4,108,925 | 8/1978 | Lee | 260/876 R |
| 4,113,797 | 9/1978 | Lee | 260/876 B |
| 4,124,654 | 11/1978 | Abolins | 260/876 B |
| 4,131,598 | 12/1978 | Abolins | 525/133 |
| 4,147,739 | 4/1979 | Lee | 260/876 R |
| 4,221,880 | 9/1980 | Fava | 525/92 |
| 4,283,503 | 8/1981 | Wright | 525/133 |

FOREIGN PATENT DOCUMENTS

| | | | |
|---|---|---|---|
| 47-47390 | 9/1972 | Japan | 525/397 |
| WO80/00349 | 3/1980 | PCT Int'l Appl. | 525/397 |

*Primary Examiner*—Paul Lieberman
*Attorney, Agent, or Firm*—Armstrong, Nikaido, Marmelstein & Kubovcik

[57] ABSTRACT

A highly heat resistant thermoplastic resin composition having high oil-resistance which contains
(a) polyphenylene ether resin,
(b) a copolymer comprising a vinyl aromatic compound and an $\alpha,\beta$-unsaturated dicarboxylic acid anhydride as components, or a copolymer comprising a vinyl aromatic compound and an imide compound of an $\alpha,\beta$-unsaturated dicarboxylic acid as components, and
(c) polyamide,
and, if desired,
(d) an impact-resistant-reinforcing agent.

24 Claims, No Drawings

HIGHLY HEAT-RESISTANT THERMOPLASTIC RESIN COMPOSITION HAVING HIGH OIL-RESISTANCE

The present invention relates to a highly heat-resistant thermoplastic resin composition having high oil-resistance. More particularly, it relates to a resin composition which comprises (1) polyphenylene ether resin, (2) a copolymer comprising a vinyl aromatic compound and an α,β-unsaturated dicarboxylic acid anhydride or a copolymer comprising a vinyl aromatic compound and an imide compound of an α,β-unsaturated dicarboxylic acid and (3) polyamide resin and additionally, if desired, (4) an impact-resistant reinforcing agent.

A polyphenylene ether resin is excellent in mechanical property, electric property and heat-resistance and it has additionally desirable properties such as high dimensional stability. Accordingly, it attracts attention as a resin suitable for uses in a wide scope; however, it has a great defect that it is poor in molding processability, impact resistance and resistance to oil and other chemicals such as gasoline.

In order to improve molding processability of polyphenylene ether resin, it is proposed to blend polyamide therewith in U.S. Pat. No. 3,379,792. However, the compatibility of polyphenylene ether resin with polyamide is very bad. Consequently, the resin composition obtained is poor in mechanical properties and a molded product obtained by injection molding thereof shows a phenomenon of stratiform peeling off resulting in no acquisition of a desirable molded product.

Also in order to improve molding processability and impact resistance, it is proposed to blend polystyrene or rubber-reinforced styrene with polyphenylene ether resin in U.S. Pat. Nos. 3,383,435, 4,128,602 and others, and to blend a rubber-reinforced copolymer of a vinyl aromatic compound and an α,β-unsaturated dicarboxylic acid anhydride with polyphenylene ether resin in U.S. Pat. No. 4,131,598; however, these resin compositions have a large defect of low oil resistance.

A resin composition comprising rubber-reinforced polystyrene and polyphenylene ether resin is excellent in impact-resistance and molding processability and industrially produced in a large amount. However, its use is limited because of low oil-resistance.

In the case of engineering plastics, high oil-resistance as well as high heat- and impact-resistance are important. If a resin having not only high oil-resistance but also high heat- and impact-resistance is realized, it can be considered that the scope of its use is remarkably extended. Relating to a polyphenylene ether resin having high heat- and impact-resistance and, in addition, high oil-resistance, there can be found quite no resin provided for practical use.

The present inventors eagerly studied to obtain a resin composition which has not only high oil-resistance but also high heat- and impact-resistance, and is widely usable. As a result, they have found a very interesting fact that a resin composition having performances which can not be found in conventional resin compositions can be obtained by blending polyphenylene ether resin, polyamide, a copolymer comprising a vinyl aromatic compound and an α,β-unsaturated dicarboxylic acid anhydride as components or a copolymer comprising a vinyl aromatic compound and an imide compound of an α,β-unsaturated dicarboxylic acid as components and additionally an impact-resistance-reinforcing agent.

The resin composition of the present invention has remarkably improved resistance to chemicals such as gasoline and aliphatic hydrocarbon compounds compared with a resin composition comprising polyphenylene ether resin and rubber-reinforced polystyrene or rubber-reinforced styrene-maleic anhydride copolymer. The present composition is also a molding material having high heat-resistance and mechanical properties.

A resin composition having remarkably high impact-resistance can be obtained by blending polyphenylene ether resin, polyamide, a copolymer comprising a vinyl aromatic compound and an α,β-unsaturated dicarboxylic acid anhydride as components or a copolymer comprising a vinyl aromatic compound and an imide compound of an α,β-unsaturated dicarboxylic acid as components and additionally an impact-resistance-reinforcing agent. On the contrary, the combination of polyphenylene ether resin, polyamide and an impact-resistance-reinforcing agent does not enable one to obtain a resin composition having high impact-resistance; also a molded product obtained by injection molding thereof is not desirable because of a phenomenon of stratiform peeling off. There can be revealed a remarkable effect by the synergitic effect of blending four materials of the present invention, particularly by the presence of a copolymer comprising a vinyl aromatic compound and an α,β-unsaturated dicarboxylic acid anhydride as components or a copolymer comprising a vinyl aromatic compound and an imide compound of an α,β-unsaturated dicarboxylic acid as components.

It can be considered that, owing to the presence of a copolymer comprising a vinyl aromatic compound and an α,β-unsaturated dicarboxylic acid anhydride as components or a copolymer comprising a vinyl aromatic compound and an imide compound of an α,β-unsaturated dicarboxylic acid as components, the state in which the resin composition of the present invention is dispersed reveals a microstructure which can not be obtained heretofore and thus there can be obtained a resin composition having excellent performance such as high impact-resistance. This is supported by the fact that, in observation of the resin composition with an electron microscope, the resin composition of the present invention is found to show a much more microdispersed state compared to a resin composition comprising polyphenylene ether resin, polyamide and an impact-resistance reinforcing agent.

Polyphenylene ether resins used in the present invention are polymers and copolymers represented by the following general formula:

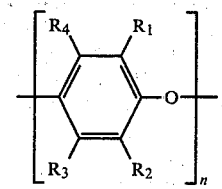

wherein $R_1$, $R_2$, $R_3$ or $R_4$ represents the residual group such as the same or different alkyl group, aryl group, halogen or hydrogen and n represents polymerization degree. Examples are:
poly(2,6-dimethylphenylene-1,4-ether),
poly(2,6-diethylphenylene-1,4-ether),
poly(2,6-dichlorophenylene-1,4-ether),
poly(2,6-dibromophenylene-1,4-ether), poly(2-methyl-6-ethylphenylene-1,4-ether),
poly(2-chloro-6-methylphenylene-1,4-ether),
poly(2-methyl-6-isopropylphenylene-1,4-ether),
poly(2,6-di-n-propylphenylene-1,4-ether),
poly(2-chloro-6-bromophenylene-1,4-ether),
poly(2-chloro-6-ethylphenylene-1,4-ether),
poly(2-methylphenylene-1,4-ether),
poly(2-chlorophenylene-1,4-ether),
poly(2-phenylphenylene-1,4-ether),
poly(2-methyl-6-phenylphenylene-1,4-ether),
poly(2-bromo-6-phenylphenylene-1,4-ether),
poly(2,4'-methylphenylphenylene-1,4-ether),
poly(2,3,6-trimethylphenylene-1,4-ether),
poly(2,3-dimethyl-6-ethylphenylene-1,4-ether), etc., copolymers thereof and vinyl aromatic compound-grafted-copolymers thereof.

The vinyl aromatic compound-grafted polyphenylene ether resin mentioned in the present invention is a co-polymer obtained by graft-copolymerization of vinyl aromatic compound such as for example, styrene, α-methylstyrene, methylstyrene, dimethylstyrene, vinyltoluene, tert-butylstyrene, chlorostyrene or the like, to the polyphenylene ether resin mentioned above.

The copolymer used in the present invention comprising a vinyl aromatic compound and an α,β-unsaturated dicarboxylic acid anhydride as components includes a non-rubber material-reinforced copolymer and an impact-resistant rubber-reinforced copolymer. In general, the copolymer used in the present invention can be produced in accordance with usual technology which utilizes radical polymerization such as bulk polymerization, solution polymerization, suspension polymerization or emulsion polymerization.

As the vinyl aromatic compound which forms the copolymer used in the present invention, there is used styrene, o-methylstyrene, p-methylstyrene, dimethylstyrene, m-ethylstyrene, chlorostyrene, isopropylstyrene, tert-butylstyrene, β-methylstyrene, ethylvinyltoluene, etc. or the mixture thereof. The α,β-unsaturated dicarboxylic acid anhydride may be a monomer which can copolymerize with a vinyl aromatic compound, for example, maleic anhydride, chloromaleic anhydride, citraconic anhydride, butenylsuccinic anhydride, tetrahydrophthalic anhydride, etc. Also a monomer which can copolymerize with a vinyl aromatic compound and an α,β-unsaturated dicarboxylic acid anhydride may be introduced into the copolymer as the third component, for instance there may be used methacrylate, acrylate, acrylic acid, methacrylic acid, vinyl cyanide or the like.

The rubber-reinforced copolymer used in the present invention can be obtained by polymerizing the monomer mentioned above in the presence of a rubber-like polymer such as polybutadiene rubber, styrene-butadiene rubber, polybutene rubber, hydrogenated styrene-butadiene rubber, acrylonitrile-butadiene rubber, ethylene-propylene rubber, polyacrylate rubber, polyisoprene rubber or natural rubber.

As examples of copolymers suitable for the present invention, there can be mentioned styrene-maleic anhydride copolymer, styrene-maleic anhydride-methacrylate copolymer, styrene-maleic anhydride-acrylate copolymer and rubber-reinforced polymer thereof.

Further, it is preferable that the copolymer used in the present invention contains 60-99 mole % of a vinyl aromatic compound and 1-40 mole % of an α,β-unsaturated dicarboxylic acid anhydride as components or that the copolymer comprising a vinyl aromatic compound and an α,β-unsaturated dicarboxylic acid anhydride as components contains 60-96 mole % of a vinyl aromatic compound, 2-30 mole % of an α,β-unsaturated dicarboxylic acid anhydride and 2-20 mole % of methacrylate or acrylate. In the case of a rubber-reinforced copolymer, it is preferable that the composition of resin phase excluding rubber is in the range mentioned above. When the content of the vinyl aromatic compound is too low or when the content of the α,β-unsaturated dicarboxylic acid anhydride is too low or too high, undesirable results will be caused because the mechanical characteristics such as impact resistance of the resin composition are lowered.

The copolymer of a vinyl aromatic compound and an imide compound of an α,β-unsaturated dicarboxylic acid used in the present invention includes a non-rubber material-reinforced copolymer and an impact-resistant rubber-reinforced copolymer. In general, the copolymer used in the present invention can be produced according to a method disclosed in Japanese published unexamined patent application No. 93091/1979, German Pat. No. 2,644,492, etc. using common technology such as bulk polymerization, solution polymerization of emulsion polymerization wherein radical polymerization is utilized. Also the copolymer of the present invention can be, as disclosed in U.S. Pat. No. 3,998,907, German Pat. No. 2,343,408, etc., produced by the treatment of a copolymer of a vinyl aromatic compound and an α,β-unsaturated cyclic anhydride with a nitrogen-containing compound.

As a vinyl aromatic compound which forms the copolymer used in the present invention, there can be mentioned styrene, o-methylstyrene, p-methylstyrene, dimethylstyrene, m-ethylstyrene, chlorostyrene, isopropylstyrene, tert-butylstyrene, α-methylstyrene, ethylvinyltoluene, etc. or a mixture thereof.

The imide compound of an α,β-unsaturated dicarboxylic acid which forms the copolymer used in the present invention can be represented by the following general formula:

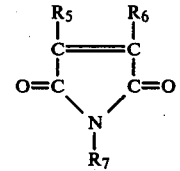

wherein $R_5$, $R_6$ or $R_7$ represents hydrogen, alkyl group, alkenyl group, cycloalkyl group, phenyl group, phenylene group, alkylene group or the like. As examples of them, there can be mentioned maleinimide, N-methylmaleinimide, N-butylmaleinimide, N-cyclohexylmaleinimide, N-phenylmaleinimide, N-(p-methylphenyl)maleinimide, N-(3,5-dimethylphenyl)maleinimide, N-(p-methoxyphenyl)maleinimide, N-benzylmaleinimide, N-(1-naphthyl)maleinimide and the like. Also a monomer which can be copolymerized with a vinyl aromatic compound and an imide compound of α,β-unsaturated dicarboxylic acid may be introduced as the third component; as examples of them, methacrylate, acrylate, acrylic acid, methacrylic acid, vinyl cyanide, etc. may be mentioned The rubber-reinforced copolymer which is used in the present invention and comprises a vinyl aromatic compound and an imide compound of an α,β-unsaturated dicarboxylic acid can be obtained by polymerizing monomers as mentioned above in the presence of a rubber-like polymer such as polybutadiene rubber, styrene-butadiene rubber, polybutene rubber, hydrogenated styrene-butadiene rubber, acrylonitrile-butadiene rubber, ethylene-propylene rubber, polyacrylate rubber, polyisoprene rubber or natural rubber.

As examples of copolymers suitable for the use of the present invention there can be mentioned styrene-N-phenylmaleinimide copolymer, styrene-maleinimide copolymer, styrene-N-phenylmaleinimide-methacrylate copolymer, styrene-N-phenylmaleinimide-acrylate copolymer and rubber-reinforced polymers thereof.

Further, it is particularly preferable that the copolymer used in the present invention is a copolymer comprising 70-99 mole % of a vinyl aromatic compound and 1-30 mole % of an imide compound of an $\alpha,\beta$-unsaturated dicarboxylic acid or a copolymer compound comprising 70-98 mole % of a vinyl aromatic compound, 1-30 mole % of an imide compound of an $\alpha,\beta$-unsaturated dicarboxylic acid and 1-20 mole % of a methacrylate. In the case of a rubber-reinforced copolymer, it is preferable that the composition of resin phase excluding rubber is in the range mentioned above. When the content of the vinyl aromatic compound is too low or when the content of the imide compound of the $\alpha,\beta$-unsaturated dicarboxylic acid is too low or too high, undesirable results will be caused because the mechanical characteristics such as impact resistance of the resin composition obtained are lowered.

It is preferable that a copolymer comprising a vinyl aromatic compound and an $\alpha,\beta$-unsaturated dicarboxylic acid anhydride as components or a copolymer comprising a vinyl aromatic compound and an imide compound of an $\alpha,\beta$-unsaturated dicarboxylic acid as components has a molecular weight in a range of 10,000-300,000. When the molecular weight is too low, physical properties of the resin composition obtained will be lowered; on the contrary, when the molecular weight is too high, molding processability of the resin composition obtained will be poor. Thus, both results are not desirable.

The copolymer used in the present invention, namely a copolymer comprising a vinyl aromatic compound and an $\alpha,\beta$-unsaturated dicarboxylic acid anhydride as components or a copolymer comprising a vinyl aromatic compound and an imide compound of an $\alpha,\beta$-unsaturated dicarboxylic acid as components may be used individually or in combination.

The polyamide used in the present invention is nylon-6, nylon-6,6, nylon-6,10, nylon-11, nylon-12, a copolymer of terephthalic acid and trimethylhexamethylenediamine(Trogamid T, produced by Dynamit Nobel Inc.), or a copolymer thereof or a modified product thereof.

From the viewpoint of mechanical properties and molding processability of the resin composition obtained, the molecular weight of the polyamide is preferably in a range of 5,000-50,000, more preferably in a range of 10,000-40,000.

As the impact-resistance-reinforcing agent which is used in the present invention and has a large effect to improve impact resistance, a graftcopolymer obtained by graft-copolymerization of a monomer containing a vinyl aromatic compound as the main component to a rubber-like polymer and various kinds of thermoplastic elastomers are preferable. The graftcopolymer obtained by graft-copolymerization of a monomer containing a vinyl aromatic compound as the main component to a rubber-like polymer means a polymer obtained by emulsion graft-copolymerization of a vinyl aromatic compound to a rubber-like polymer in latex state, a polymer obtained by polymerization of a solution prepared by dissolving a rubber-like polymer in a solvent which contains a vinyl aromatic compound as the main component in accordance with the technology such as bulk polymerization, solution polymerization or suspension polymerization or a polymer like them. The rubber-like polymer used herein includes polybutadiene, styrene-butadiene copolymer, acrylonitrile-butadiene copolymer, ethylene-propylene copolymer, polyacrylate, polyisoprene and the like. The vinyl aromatic compound includes styrene, o-methylstyrene, p-methylstyrene, dimethylstyrene, isopropylstyrene, tert-butylstyrene, $\alpha$-methylstyrene, ethylvinyltoluene and the like. The monomer which is used together with the vinyl aromatic compound includes acrylate, methacrylate, acrylonitrile, methacrylonitrile, methacrylic acid, acrylic acid and the like. These monomers are further added to the mixture of polyphenylene ether resin, a copolymer comprising a vinyl aromatic compound and an $\alpha,\beta$-unsaturated dicarboxylic acid anhydride or a copolymer comprising a vinyl aromatic compound and an imide compound of an $\alpha,\beta$-unsaturated dicarboxylic acid and polyamide as far as they do not impede the compatibility with the mixture. It is preferable that the content of these monomers is not higher than 20 wt. % in the graftcopolymer composition.

Though a high impact polystyrene conventionally put on the market can be used as an impact-resistance-reinforcing agent, a more preferable graftcopolymer is one having much content of rubber-like polymer. The content of the rubber-like polymer in the graftcopolymer is preferably not less than 10 wt.%, more preferably 30-70 wt. %. The particle size of dispersed rubber in the graftcopolymer may be in a range from the state of small particles obtained by emulsion polymerization to the state of large particles obtained by bulk polymerization, solution polymerization or suspension polymerization.

The thermoplastic elastomer mentioned in the present invention includes styrene-butadiene block-copolymer, hydrogenated styrene-butadiene block-copolymer, ethylene-propylene elastomer, styrene-grafted-ethylene-propylene elastomer, thermoplastic polyester elastomer, ethylenic ionomer resin and the like. The styrene-butadiene block-copolymer includes AB type, ABA type, ABA taper type, radial teleblock type and the like. As an impact-resistance-reinforcing agent, the graftcopolymer or the thermoplastic elastomer may be used individually or in combination.

The above-mentioned polyphenylene ether resin, a copolymer comprising a vinyl aromatic compound and an $\alpha,\beta$-unsaturated dicarboxylic acid anhydride as components or a copolymer comprising a vinyl aromatic compound and an imide compound of an $\alpha,\beta$-unsaturated dicarboxylic acid as components, polyamide and an impact-resistance-reinforcing agent can be blended in an arbitrary ratio. However, from the viewpoint of balance of mechanical property, molding processability, oil-resistance and the like, it is preferable that each component selected from the range mentioned below is contained in the resin composition: polyphenylene ether resin in 10-70 wt. %, a copolymer comprising a vinyl aromatic compound and an $\alpha,\beta$-unsaturated dicarboxylic acid anhydride as components or a copolymer comprising a vinyl aromatic compound and an imide compound of an $\alpha,\beta$-unsaturated dicarboxylic acid as components in 2–50 wt. %, polyamide in 5–70 wt. % and an impact-resistance-reinforcing agent in 0–70 wt. %. Further, it is more preferable that, in the ratio of polyamide to the copolymer comprising a vinyl aromatic compound and an α,β-unsaturated dicarboxylic acid anhydride as components or the copolymer comprising a vinyl aromatic compound and an imide compound of an α,β-unsaturated dicarboxylic acid as components, 100 weight parts of polyamide is combined with not less than 10 weight parts of the copolymer comprising a vinyl aromatic compound and an α,β-unsaturated dicarboxylic acid anhydride as components or the copolymer comprising a vinyl aromatic compound and an imide compound of an α,β-unsaturated dicarboxylic acid as components.

Also it is most preferable that the total amount of the rubber-like polymer in the resin composition of the present invention obtained by summing up the amounts of the rubber-like polymer in the rubber-reinforced copolymer comprising a vinyl aromatic compound and an α,β-unsaturated dicarboxylic acid anhydride as components or copolymer comprising a vinyl aromatic compound and an imide compound of an α,β-unsaturated dicarboxylic acid as components, the rubber-like polymer in the graftcopolymer and thermoplastic elastomer is in a range not higher than 30 wt. %. When the content of the rubber-like polymer is too high, undesirable result will occur because the heat-resistance and rigidity of the resin composition are lowered.

Also it is possible to blend other polymers in addition to the resin composition of the present invention mentioned above. Particularly preferable one among these polymers is a polymer comprising 80 wt. % or more of a vinyl aromatic compound, and examples of them are polystyrene, styrene-tert-butylstyrene copolymer, styrene-methyl methacrylate copolymer, styrene-methyl acrylate copolymer, styrene-acrylic acid copolymer, styrene-methacrylic acid copolymer and the like. When the content of the vinyl aromatic compound in these copolymers is too low, undesirable result will occur because particularly the impact-resistance of the resin composition is remarkably lowered.

It is possible to add a flame retardant, a plasticizer and the like to the resin composition of the present invention mentioned above. Particularly phosphorous compounds are preferable because of improvement in molding processability, flame retarding effect and the like. Particularly preferable are phosphoric acid esters, phosphorous acid esters and the compounds represented by the following general formulae (A) and (B):

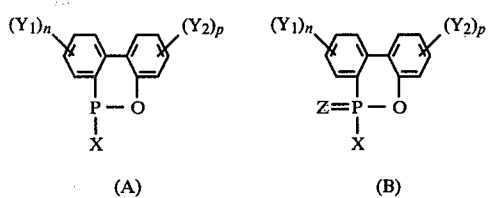

wherein X represents hydrogen, hydroxy group, amino group, an alkyl group having 1–10 carbon atoms, an alkoxy group having 1–10 carbon atoms or an allyloxy group having 1–10 carbon atoms, $Y_1$ and $Y_2$ represent an alkyl group having 1–8 carbon atoms or an alkoxy group having 1–8 carbon atoms, respectively, Z represents oxygen or sulfur and n and p are integers of 0–4. Though there is no limitation about the amount to be added, 0.1–30 weight parts of the compound mentioned above may be added to 100 weight parts of the resin composition.

As the method to obtain the resin composition of the present invention, three can be used extruder, roll mixer, Bumbury's mixer, kneader mixer or the like for melting and mixing. Relating to the procedure for melting and mixing, all the components may be molten and mixed at the same time or there may be used such method that two to three kinds of component are preliminarily molten and mixed or a part of other components is molten and mixed when a vinyl aromatic compound is graft-copolymerized to polyphenylene ether resin. Sometimes it is preferable in mechanical characteristics and the like to obtain the resin composition of the present invention by preliminarily melting and mixing the copolymer comprising a vinyl aromatic compound and an α,β-unsaturated dicarboxylic acid anhydride as components or the copolymer comprising a vinyl aromatic compound and an imide compound of an α,β-unsaturated dicarboxylic acid as components and polyamide, adding other components and finally melting and mixing the whole mixture.

The resin composition of the present invention may further contain a strength-reinforcing filler. As a strength reinforcing filler, there may be used glass fiber, carbon fiber, asbestos, wollastonite, calcium carbonate, talc, mica, zinc oxide, titanium oxide, potassium titanate or the like. Especially, heat resistance is remarkably improved by the combination with glass fiber and a molding material having accurate dimension and satisfactory mechanical properties can be obtained. Also by the combination with carbon fiber, a molding material having high rigidity and satisfactory mechanical properties in addition to that can be obtained.

Various additives other than those mentioned above, for example, plasticizer, colorant, stabilizer and the like may be included in the resin composition of the present invention. Also an other polymer, for example, polyethylene, polypropylene, polyester or the like may be blended with the resin composition of the present invention as far as it does not deteriorate the characteristics such as mechanical properties.

The present invention will be explained in detail hereinbelow with examples; however, the present invention is not limited thereby. Part represents part by weight.

EXAMPLES 1–3

Fifty parts of styrene-maleic anhydride copolymer having a $\eta_{sp/c}=0.62$ (measured in a solution thereof in a solvent mixture of m-cresol/methyl ethyl ketone=9/1) containing 10 mole % of maleic anhydride and 50 parts of nylon-6 having a $\eta_{sp/c}=1.25$ (Amilan ® 1017, produced by Toray Limited) were molten and kneaded with a twin-screw extruder to obtain a pellet-like resin (hereinafter referred to as Polymer A). The Polymer A thus obtained and poly(2,6-dimethylphenylene-1,4-ether) having a $\eta_{sp/c}=0.64$ (measured in a solution thereof in chloroform) were mixed in ratios shown in Table 1. To 100 parts of this resin mixture was added 1 part of a phosphorous compound represented by the following formula:

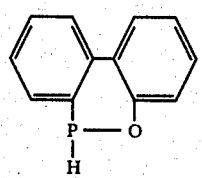

The mixture was mixed in a blender, molten and kneaded with a twin-screw extruder at a temperature of 220°–280° C. to obtain a resin composition. The resin composition thus obtained was subjected to injection molding to prepare test pieces. Tensile strength, elongation, Izod impact strength and heat distortion temperature were measured with them in accordance with the test method JIS K 6871. For the observation of the state of stratiform peeling off, a Scotch tape was adhered to the surface of a broken test piece and then peeled off. After the tape was peeled off, the state of the portion was observed with the naked eye. Results are shown in Table 1.

EXAMPLE 4

Fifty parts of poly(2,6-dimethylphenylene-1,4-ether) having a $\eta_{sp/c}=0.64$, 10 parts, of styrene and 0.6 part of di-tert-butyl peroxide were mixed with a Henschel mixer. Fifty parts of styrene-grafted-poly(2,6-dimethylphenylene-1,4-ether) obtained by graft-copolymerization of said mixture with a twin-screw extruder at 280° C. in a molten and kneaded state, 20 parts of nylon-6 (Amilan ® 1017, produced by Toray Limited), 20 parts of styrene-maleic anhydride copolymer (Dylark ® 232, produced by Arco Polymer Co.) and 10 parts of polystyrene (Styron ® 685, produced by Asahi-Dow Limited) were mixed, molten and kneaded with a twin-screw extruder at 220°–280° C. to obtain a resin composition. Tests were carried out in accordance with the same procedure as that in Example 1. Results are shown in Table 1.

EXAMPLES 5–7

The poly(2,6-dimethylphenylene-1,4ether) used in Example 1, the Polymer A and a graftcopolymer obtained by emulsion graft-polymerization of 40 parts of styrene in the presence of 60 parts of polybutadiene latex were mixed in ratios shown in Table 2. To 100 parts of this resin mixture was further added 0.5 part of a phosphorous compound represented by the following formula:

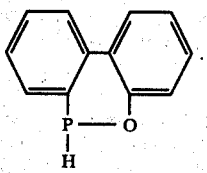

The mixture was mixed in a blender, molten and kneaded with a twin-screw extruder at a temperature of 220°–290° C. to obtain a resin composition. Tests were carried out in accordance with the same procedure as that in Example 1. In addition, for the purpose of gasoline-resistance test, the test piece obtained by injection molding was immersed in gasoline at 23° C. for 1.5 hours and the state of crack occurrence was observed. Results are shown in Table 2.

EXAMPLES 8–10

The styrene-grafted-poly(2,6-dimethylphenylene-1,4-ether) used in Example 4, nylon-6, styrene-maleic anhydride copolymer and the emulsion graftcopolymer used in Example 5 were mixed in ratios shown in Table 2 to obtain resin compositions and the tests thereof were carried out in accordance with the same procedure as that in Example 5. Results are shown in Table 2.

EXAMPLES 11–13

Fifty parts of rubber-reinforced styrene-maleic anhydride copolymer (Dylark ® 250, produced by Arco Polymer Co.) and 50 parts of nylon-6 were molten and kneaded with a twin-screw extruder to obtain a pellet-like resin (hereinafter referred to as Polymer B). The polymer B thus obtained, styrene-grafted-poly(2,6-dimethylphenylene-1,4-ether) used in Example 4, high impact polystyrene (polybutadiene content: 20 wt. %, obtained by solution polymerization) and hydrogenated styrene-butadiene block-copolymer (KRATON G1650, produced by Shell Chemical Co.) were mixed in ratios shown in Table 3 to obtain resin compositions and the tests thereof were carried out in accordance with the same procedure as that in Example 1. Results are shown in Table 3.

Examples 14–16

Poly(2,6-dimethylphenylene-1,4-ether) used in Example 1, nylon-6, high impact polystyrene used in Example 11, styrene-maleic anhydride-methyl methacrylate copolymer having a $\eta_{sp/c}=0.85$ (maleic anhydride content: 9 mole % and methyl methacrylate content: 5 mole %), styrene-maleic anhydride copolymer having a $\eta_{sp/c}=0.50$ (maleic anhydride content: 5 mole %) and polystyrene used in Example 4 were mixed in combinations and ratios shown in Table 3. To 100 parts of this resin mixture was further added 6 parts of triphenyl phosphate and they were mixed by a blender. The mixture was molten and kneaded at 220°–280° C. with a twin-screw extruder to obtain resin compositions and the tests thereof were carried out in accordance with the same procedure as that in Example 1. Results are shown in Table 3.

EXAMPLES 17–19

Fifty parts of styrene-N-phenylmaleinimide copolymer having a $\eta_{sp/c}=0.56$ (N-phenylmaleinimide content: 14 mole %) and 50 parts of nylon-6 (Amilan ® CM 1017, produced by Toray Limited) were molten and kneaded with a twin-screw extruder to obtain a pellet-like resin (hereinafter referred to as Polymer C). The Polymer C thus obtained and poly(2,6-dimethylphenylene-1,4-ether) having a $\eta_{sp/c}=0.64$ (measured in a solution thereof in chloroform at 30° C.) were mixed in ratios shown in Table 4. To 100 parts of this resin mixture was added 0.5 part of 9,10-dihydro-9-oxa-10-phosphaphenanthrene-10-oxide (SANKO-HCA, produced by Sanko Chemicals Co., Ltd.). The mixture was mixed with a blended, molten and kneaded with a twin-screw extruder at a temperature of 220°–280° C. to obtain a resin composition. The resin compositions were subjected to the same tests as those in Example 1. Results are shown in Table 4.

EXAMPLE 20

Fifty parts of poly(2,6-dimethylphenylene-1,4-ether) having a $\eta_{sp/c}=0.64$, 10 parts of styrene and 0.6 part of di-tert-butyl peroxide were mixed with a Henschel mixer. Fifty parts of styrene-grafted-poly(2,6-dimethylphenylene-1,4-ether) obtained by graft-copolymerization of said mixture with a twin-screw extruder at 280° C. in a molten and kneaded state, 20 parts of nylon-6 (Amilan ® CM 1017, produced by Toray Limited), 20 parts of styrene-N-phenylmaleinimide copolymer used in Example 17 (N-phenylmaleinimide content: 14 mole %) and 10 parts of polystyrene (Styron ® 685, produced by Asahi-Dow Limited) were mixed, molten and kneaded with a twin-screw extruder at a temperature of 220°–280° C. to obtain a resin composition. Using this resin composition, tests were carried out in accordance with the same procedure as that in Example 1. Results are shown in Table 4.

EXAMPLE 21

Seventy parts of styrene-grafted-poly(2,6-dimethylphenylene-1,4-ether) used in Example 20, 10 parts of nylon-6 (Amilan ® CM 1017), 8 parts of styrene-maleinimide copolymer having a $\eta_{sp/c}=0.65$ (maleinimide content: 9 mole %) and 12 parts of polystyrene (Styron ® 685) were used to obtain a resin composition in accordance with the same procedure as that in Example 20. Tests were carried out with the resin composition and results are shown in Table 4.

EXAMPLE 22

Styrene-grafted-poly(2,6-dimethylphenylene-1,4-ether), nylon-6 and styrene-N-phenylmaleinimide copolymer used in Example 20 were mixed in the ratio shown in Table 4 to obtain a resin composition in accordance with the same procedure as that in Example 20. Tests were carried out with the resin composition and results are shown in Table 4.

COMPARATIVE EXAMPLES 1 AND 2

Using polystyrene (Styron ® 685) [Comparative example 1] instead of styrene-maleic anhydride copolymer in Example 4 or styrene-N-phenylmaleinimide copolymer in Example 20, or using styrene-methyl methacrylate copolymer (methyl methacrylate content: 15 mole %) [Comparative example 2] instead of the styrene-N-phenylmaleinimide copolymer and the polystyrene in Example 20, resin compositions were obtained in accordance with the same procedure as that mentioned above. Tests were carried out with the resin compositions and results shown in Table 1 and Table 4. The molded product obtained from this resin composition showed a remarkable stratiform peeling off phenomenon and was not satisfactory in mechanical strengths.

EXAMPLES 23–25

Poly(2,6-dimethylphenylene-1,4-ether) used in Example 17, the Polymer C and a graftcopolymer obtained by graft-copolymerization of 40 parts of styrene in the presence of 60 parts of polybutadiene latex were mixed in ratios shown in Table 2. To 100 parts of this resin mixture was further added 0.5 part of SANKO-HCA. The mixture was mixed in a blender, molten and kneaded with a twin-screw extruder at a temperature of 220°–290° C. to obtain a resin composition. Tests were carried out with the resin composition in accordance with the same procedure as that in Example 1. In addition for the purpose of gasoline-resistance test, the test piece obtained by injection molding was immersed in gasoline at 23° C. for 1.5 hours and the state of crack occurrence was observed. Results are shown in Table 5.

EXAMPLES 26–28

Styrene-grafted-poly(2,6-dimethylphenylene-1,4-ether), nylon-6 and styrene-N-phenylmaleinimide copolymer which were used in Example 20 and emulsion graft copolymer used in Example 23 were mixed in ratios shown in Table 5 to obtain resin compositions in accordance with the same procedure as that in Example 23. Tests were carried out and results are shown in Table 5.

COMPARATIVE EXAMPLES 3 AND 4

Using polystyrene (Styron ® 685) [Comparative example 3] or styrene-methyl methacrylate copolymer (methyl methacrylate content: 15 mole %) [Comparative example 4] instead of styrene-maleic anhydride copolymer used in Example 8 or styrene-N-phenyl maleinimide copolymer used in Example 26, resin compositions were obtained in accordance with the same procedure as that in Example 26. Tests were carried out with these resin compositions and results are shown in Table 5. The molded product thereof showed a low impact-resistance and stratiform peeling off. Thus no desirable molding material was obtained.

COMPARATIVE EXAMPLE 5

Styrene-grafted-poly(2,6-dimethylphenylene-1,4-ether), styrene-maleic anhydride copolymer and emulsion graft-copolymer used respectively in Example 8 were mixed in a ratio shown in Table 2 to obtain a resin composition in accordance with the same procedure as that in Example 8. Tests were carried out with the resin composition and results are shown in Table 2. When the test piece obtained by injection molding was immersed in gasoline, remarkable crack occurrence was observed. Thus, no molding material having high gasoline-resistance was obtained.

COMPARATIVE EXAMPLES 6 AND 7

Styrene-grafted-poly(2,6-dimethylphenylene-1,4-ether) and styrene-N-phenylmaleinimide which were used in Example 26, polystyrene (Styron ® 685) and emulsion graft-copolymer which were used in Example 26 were mixed in ratios shown in Table 2 to obtain resin compositions in accordance with the same procedure as that in Example 26. Tests were carried out with the resin compositions and results are shown in Table 5. When the test piece obtained by injection molding was immersed in gasoline, remarkable crack occurrence was observed. Thus no molding material having high gasoline resistance was obtained.

EXAMPLES 29–31

Fifty parts of rubber-reinforced styrene-N-phenylmaleinimide copolymer (N-phenylmaleinimide content: 10 mole % and rubber-like polymer content: 9 wt. %) and 50 parts of nylon-6 were molten and kneaded with a twin-screw extruder to obtain a pellet-like resin composition (hereinafter referred to as Polymer D). The Polymer D thus obtained, styrene-grafted-poly(2,6-dimethylphenylene-1,4-ether) used in Example 20, high impact polystyrene (polybutadiene content: 20 wt. %, obtained by solution polymerization) and hydrogenated styrene-butadiene block-copolymer (KRATON G 1650, produced by Shell Chemical Co.) were mixed in ratios shown in Table 6 to obtain resin compositions in accordance with the same procedure as that in Example 1. Tests were carried out with the resin compositions and results are shown in Table 6.

EXAMPLES 32-34

Poly(2,6-dimethylphenylene-1,4-ether) used in Example 17, nylon-6, high impact polystyrene used in Example 30, styrene-N-phenylmaleinimide-methyl methacrylate copolymer having a $\eta_{sp/c}=0.62$ (N-phenylmaleinimide content: 14 mole % and methyl methacrylate content: 5 mole %), styrene-N-phenylmaleinimide copolymer having a $\eta_{sp/c}=0.60$ (N-phenylmaleinimide content: 5 mole %) and polystyrene used in Example 20 were mixed in combinations and ratios shown in Table 6. To 100 parts of this resin mixture was further added 6 parts of triphenyl phosphate. The mixture was mixed in a blender, and then molten and kneaded with a twin-screw extruder at a temperature of 220°–280° C. to obtain resin compositions. Tests were carried out with the resin compositions in accordance with the same procedure as that in Example 1. Results are shown in Table 6.

Finally, in order to compare the chemical resistance of the resin composition of the present invention with that of rubber-reinforced polystyrene/polyphenylene ether resin composition, the chemical resistances of the compositions of the present invention in Example 8 and Example 26 were compared with that of rubber-reinforced polystyrene/polyphenylene ether resin composition. The results are shown in Table 7. The chemical resistance was measured as mentioned below. A test piece having a size of 100×12.7×3 mm was attached to a bending model having a parabola shape and then allowed to contact cyclohexane in a state wherein a uniform and continuous stress is given to the test piece. Cracks which occurred in the test piece were observed and the curvature at the point where a crack begins to occur was obtained. The stress of the test piece at this point was calculated and this value was evaluated as the critical stress.

EXAMPLE 35

Twenty four parts of poly(2,6-dimethylphenylene-1,4-ether) and 14 parts of styrene-maleic anhydride copolymer which were used in Example 1, 35 parts of nylon-6 and 30 parts of glass fiber were mixed and the mixture was kneaded with a bent type twin-screw extruder at 300° C. to obtain a pellet-like glass fiber-reinforced resin composition. Tests were carried out with the resin composition in accordance with the same procedure as that in Example 1. Bending strength and bending modulus were measured in accordance with the method described in ASTM D 790. In addition, the shrinkage after injection molding was measured with a square flat plate having a side of 150 mm and a thickness of 3 mm. Results are shown in Table 5.

Example 36

Using carbon fiber instead of glass fiber in Example 35, a carbon fiber-reinforced composition was obtained and tests thereof were carried out. Results are shown in Table 8.

TABLE 1

Recipe and physical properties of resin compositions

|  |  | Example 1 | Example 2 | Example 3 | Example 4 | Comparative example 1 | Comparative example 2 |
|---|---|---|---|---|---|---|---|
| Recipe | Poly(2,6-dimethylphenylene-1,4-ether) | 60 | 50 | 30 | — | — | — |
|  | Styrene-grafted-poly(2,6-dimethylphenylene-1,4-ether) | — | — | — | 50 | 50 | 50 |
|  | Polymer-A | 40 | 50 | 70 | — | — | — |
|  | Nylon-6 | — | — | — | 20 | 20 | 20 |
|  | Styrene-maleic anhydride copolymer | — | — | — | 20 | — | — |
|  | Polystyrene | — | — | — | 10 | 30 | — |
|  | Styrene-methyl methacrylate copolymer | — | — | — | — | — | 30 |
| Physical properties | Tensile strength (Kg/cm$^2$) | 810 | 790 | 770 | 730 | 620 | 630 |
|  | Elongation (%) | 8 | 9 | 9 | 6 | 4 | 4 |
|  | Izod impact strength (Kg-cm/cm) | 2.0 | 1.8 | 1.6 | 1.5 | 1.2 | 1.3 |
|  | Heat distortion temperature (°C.) | 139 | 131 | 115 | 120 | 115 | 115 |
| Peeling off of molded product |  | none | none | none | none | remarkable occurrence | remarkable occurrence |

TABLE 2

Recipe and physical properties of resin compositions

|  |  | Example 5 | Example 6 | Example 7 | Example 8 | Example 9 |
|---|---|---|---|---|---|---|
| Recipe | Poly(2,6-dimethylphenylene-1,4-ether) | 60 | 40 | 30 | — | — |
|  | Styrene-grafted-poly(2,6-dimethylphenylene-1,4-ether) | — | — | — | 40 | 20 |
|  | Polymer-A | 30 | 40 | 50 | — | — |
|  | Nylon-6 | — | — | — | 20 | 30 |
|  | Styrene-maleic anhydride copolymer | — | — | — | 20 | 30 |
|  | Polystyrene | — | — | — | — | — |

TABLE 2-continued

Recipe and physical properties of resin compositions

|  |  |  |  |  |  |  |
|---|---|---|---|---|---|---|
|  | Styrene-methyl methacrylate copolymer | — | — | — | — | — |
|  | Emulsion graftcopolymer | 10 | 20 | 20 | 20 | 20 |
| Physical properties | Tensile strength (Kg/cm²) | 650 | 620 | 630 | 570 | 550 |
|  | Elongation (%) | 38 | 45 | 40 | 30 | 25 |
|  | Izod impact strength (Kg-cm/cm) | 12 | 25 | 23 | 18 | 12 |
|  | Heat distortion temperature (°C.) | 141 | 122 | 114 | 112 | 103 |
| Gasoline resistance (state of cracks) |  | no crack | no crack | no crack | no crack | no crack |
| Peeling off of molded product |  | none | none | none | none | none |

|  |  | Example 10 | Comparative example 3 | Comparative example 4 | Comparative example 5 |
|---|---|---|---|---|---|
| Recipe | Poly(2,6-dimethylphenylene-1,4-ether) | — | — | — | — |
|  | Styrene-grafted-poly(2,6-dimethylphenylene-1,4-ether) | 15 | 40 | 40 | 40 |
|  | Polymer-A | — | — | — | — |
|  | Nylon-6 | 50 | 20 | 20 | — |
|  | Styrene-maleic anhydride copolymer | 25 | — | — | 40 |
|  | Polystyrene | — | 20 | — | — |
|  | Styrene-methyl methacrylate copolymer | — | — | 20 | — |
|  | Emulsion graftcopolymer | 10 | 20 | 20 | 20 |
| Physical properties | Tensile strength (Kg/cm²) | 630 | 410 | 430 | 550 |
|  | Elongation (%) | 36 | 5 | 7 | 20 |
|  | Izod impact strength (Kg-cm/cm) | 8 | 2 | 3 | 25 |
|  | Heat distortion temperature (°C.) | 95 | 109 | 110 | 113 |
| Gasoline resistance (state of cracks) |  | no crack | no crack | no crack | remarkable crack occurrence |
| Peeling off of molded product |  | none | remarkable occurrence | remarkable occurrence | no crack |

TABLE 3

Recipe and physical properties of resin compositions

|  |  | Example 11 | Example 12 | Example 13 | Example 14 | Example 15 | Example 16 |
|---|---|---|---|---|---|---|---|
| Recipe | Poly(2,6-dimethylphenylene-1,4-ether) | — | — | — | 35 | 40 | 35 |
|  | Styrene-grafted-poly(2,6-dimethylphenylene-1,4-ether) | 50 | 40 | 50 | — | — | — |
|  | Polymer-B | 50 | 40 | 30 | — | — | — |
|  | Nylon-6 | — | — | — | 15 | 15 | 15 |
|  | Styrene-maleic anhydride-methyl methacrylate copolymer | — | — | — | 15 | — | — |
|  | Styrene-maleic anhydride copolymer | — | — | — | — | 10 | 10 |
|  | Polystyrene | — | — | — | — | — | 5 |
|  | High impact polystyrene | — | 20 | 15 | 35 | 35 | 35 |
|  | Hydrogenated styrene-butadiene block copolymer | — | — | 5 | — | — | — |
| Physical properties | Tensile strength (Kg/cm²) | 680 | 610 | 580 | 470 | 480 | 430 |
|  | Elongation (%) | 60 | 72 | 86 | 35 | 28 | 22 |
|  | Izod impact strength (Kg-cm/cm) | 6 | 9 | 14 | 12 | 15 | 13 |
|  | Heat distortion temperature (°C.) | 121 | 109 | 118 | 95 | 103 | 93 |
| Peeling off of molded product |  | none | none | none | none | none | none |

TABLE 4

Recipe and physical properties of resin compositions

|  |  | Example 17 | Example 18 | Example 19 | Example 20 | Example 21 |
|---|---|---|---|---|---|---|
| Recipe | Poly(2,6-dimethylphenylene-1,4-ether) | 60 | 50 | 30 | — | — |
|  | Styrene-grafted-poly(2,6-dimethylphenylene-1,4-ether) | — | — | — | 50 | 70 |
|  | Polymer-C | 40 | 50 | 70 | — | — |
|  | Nylon-6 | — | — | — | 20 | 10 |

TABLE 4-continued

| Recipe and physical properties of resin compositions | | | | | |
|---|---|---|---|---|---|
| | Styrene-N-phenylmaleinimide copolymer | — | — | — | 20 | — |
| | Styrene-maleinimide copolymer | — | — | — | — | 8 |
| | Polystyrene | — | — | — | 10 | 12 |
| | Styrene-methyl methacrylate copolymer | — | — | — | — | — |
| Physical properties | Tensile strength (Kg/cm$^2$) | 800 | 790 | 780 | 740 | 750 |
| | Elongation (%) | 14 | 10 | 9 | 9 | 10 |
| | Izond impact strength (Kg-cm/cm) | 2.0 | 1.8 | 1.6 | 1.6 | 1.5 |
| | Heat distortion temperature (°C.) | 141 | 135 | 120 | 122 | 138 |
| Peeling off of molded product | | none | none | none | none | none |

| | | Example 22 | Comparative example 1 | Comparative example 2 |
|---|---|---|---|---|
| Recipe | Poly(2,6-dimethylphenylene-1,4-ether) | — | — | — |
| | Styrene-grafted-poly(2,6-dimethylphenylene-1,4-ether) | 25 | 50 | 50 |
| | Polymer-C | — | — | — |
| | Nylon-6 | 50 | 20 | 20 |
| | Styrene-N-phenylmaleinimide copolymer | 25 | — | — |
| | Styrene-maleinimide copolymer | — | — | — |
| | Polystyrene | — | 30 | — |
| | Styrene-methyl methacrylate copolymer | — | — | 30 |
| Physical properties | Tensile strength (Kg/cm$^2$) | 780 | 620 | 630 |
| | Elongation (%) | 12 | 4 | 4 |
| | Izod impact strength (Kg-cm/cm) | 1.4 | 1.2 | 1.3 |
| | Heat distortion temperature (°C.) | 100 | 115 | 115 |
| Peeling off of molded product | | none | remarkable occurrence | remarkable occurrence |

TABLE 5

| Recipe and physical properties of resin compositions | | | | | | | |
|---|---|---|---|---|---|---|---|
| | | Example 23 | Example 24 | Example 25 | Example 26 | Example 27 | Example 28 |
| Recipe | Poly(2,6-dimethylphenylene-1,4-ether) | 60 | 40 | 30 | — | — | — |
| | Styrene-grafted-poly(2,6-dimethylphenylene-1,4-ether) | — | — | — | 40 | 20 | 15 |
| | Polymer-C | 30 | 40 | 50 | — | — | — |
| | Nylon-6 | — | — | — | 20 | 30 | 50 |
| | Styrene-N-phenylmaleinimide copolymer | — | — | — | 20 | 30 | 25 |
| | Polystyrene | — | — | — | — | — | — |
| | Styrene-methyl methacrylate copolymer | — | — | — | — | — | — |
| | Emulsion graftcopolymer | 10 | 20 | 20 | 20 | 20 | 10 |
| Physical properties | Tensile strength (Kg/cm$^2$) | 660 | 610 | 610 | 580 | 540 | 620 |
| | Elongation (%) | 35 | 60 | 45 | 33 | 22 | 40 |
| | Izod impact strength (Kg-cm/cm) | 10 | 20 | 19 | 17 | 10 | 8 |
| | Heat distortion temperature (°C.) | 140 | 122 | 115 | 112 | 104 | 96 |
| Gasoline resistance (state of cracks) | | no crack | no crack | no crack | no crack | no crack | no crack |
| Peeling off of molded product | | none | none | none | none | none | none |

| | | Comparative example 3 | Comparative example 4 | Comparative example 6 | Comparative example 7 |
|---|---|---|---|---|---|
| Recipe | Poly(2,6-dimethylphenylene-1,4-ether) | — | — | — | — |
| | Styrene-grafted-poly(2,6-dimethylphenylene-1,4-ether) | 40 | 40 | 40 | 40 |
| | Polymer-C | — | — | — | — |
| | Nylon-6 | 20 | 20 | — | — |
| | Styrene-N-phenylmaleinimide copolymer | — | — | 40 | — |
| | Polystyrene | 20 | — | — | 40 |
| | Styrene-methyl methacrylate copolymer | — | 20 | — | — |
| | Emulsion graftcopolymer | 20 | 20 | 20 | 20 |
| Physical | Tensile strength (Kg/cm$^2$) | 410 | 430 | 550 | 430 |

TABLE 5-continued

| Recipe and physical properties of resin compositions | | | | | |
|---|---|---|---|---|---|
| properties | Elongation (%) | 5 | 7 | 20 | 28 |
| | Izod impact strength (Kg-cm/cm) | 2 | 3 | 25 | 23 |
| | Heat distortion temperature (°C.) | 109 | 110 | 113 | 101 |
| Gasoline resistance (state of cracks) | | no crack | no crack | remarkable crack occurrence | remarkable crack occurrence |
| Peeing off of molded product | | remarkable | remarkable occurrence | none occurrence | none |

TABLE 6

| Recipe and physical properties of resin compositions | | | | | | | |
|---|---|---|---|---|---|---|---|
| | | Example 29 | Example 30 | Example 31 | Example 32 | Example 33 | Example 34 |
| Recipe | Poly(2,6-dimethylphenylene-1,4-ether) | — | — | — | 35 | 40 | 35 |
| | Styrene-grafted-poly(2,6-dimethylphenylene-1,4-ether) | 50 | 40 | 50 | — | — | — |
| | Polymer-D | 50 | 40 | 30 | — | — | — |
| | Nylon-6 | — | — | — | 15 | 15 | 15 |
| | Styrene-N-phenylmaleinimide-methyl methacrylate copolymer | — | — | — | 15 | — | — |
| | Styrene-N-phenylmaleinimide copolymer | — | — | — | — | 10 | 10 |
| | Polystyrene | — | — | — | — | — | 5 |
| | High impact polystyrene | — | 20 | 15 | 35 | 35 | 35 |
| | Hydrogenated styrene-butadiene block copolymer | — | — | 5 | — | — | — |
| Physical properties | Tensile strength (Kg/cm²) | 690 | 590 | 550 | 490 | 470 | 430 |
| | Elongation (%) | 58 | 65 | 80 | 50 | 35 | 28 |
| | Izod impact strength (Kg-cm/cm) | 5 | 10 | 15 | 12 | 16 | 14 |
| | Heat distortion temperature (°C.) | 121 | 109 | 117 | 96 | 104 | 93 |
| Peeling off of molded product | | none | none | none | none | none | none |

TABLE 7.

| Comparison of chemical resistances | |
|---|---|
| | Chemical resistance, critical stress due to cyclohexane (%) |
| Composition in Example 8 (The resin composition of the present invention) | 0.53% |
| Composition in Example 26 (The resin composition of the present invention) | 0.50% |
| Composition in Comparative example 7 (Rubber reinforced polystyrene/ polyphenylene ether composition) | 0.21% |

TABLE 8.

| Physical properties of reinforced resin composition | | |
|---|---|---|
| | Example 35 | Example 36 |
| Heat distortion temperature (°C.) | 190 | 170 |
| Izod impact strength (Kg-cm/cm) | 7 | 3 |
| Bending strength (Kg/cm²) | 1870 | 1940 |
| Bending modulus (Kg/cm²) | 79600 | 13200 |
| Molding shrinkage (%) | 0.31 | 0.32 |

We claim:

1. A thermoplastic resin composition having high oil-resistance which comprises (a) polyphenylene ether resin, (b) a copolymer comprising a vinyl aromatic compound and an $\alpha,\beta$-unsaturated dicarboxylic acid anhydride as components, or a copolymer comprising a vinyl aromatic compound and an imide compound of an $\alpha,\beta$-unsaturated dicarboxylic acid as components, and (c) polyamide.

2. The resin composition of claim 1 which additionally comprises (d) an impact-resistant reinforcing agent.

3. The resin composition of claim 1 wherein the component (a) is 10–70 wt. %, the component (b) is 2–50 wt. % and the component (c) is 5–70 wt. %.

4. The resin composition of claim 2 wherein the component (d) is 70 wt. % at the highest, on the basis of the composition.

5. The resin composition of claim 1 or 2 wherein the polyphenylene ether resin is poly(2,6-dimethylphenylene-1,4-ether).

6. The resin composition of claim 1 or 2 wherein the polyphenylene ether is vinyl aromatic compound-grafted-poly(2,6-dimethylphenylene-1,4-ether).

7. The resin composition of claim 1 or 2 wherein the copolymer comprising a vinyl aromatic compound and an $\alpha,\beta$-unsaturated dicarboxylic acid anhydride contains 60–99 mole % of the vinyl aromatic compound and 1–40 mole % of the $\alpha,\beta$-unsaturated dicarboxylic acid anhydride and has a molecular weight in the range of 10,000–300,000.

8. The resin composition of claim 1 or 2 wherein the copolymer comprising a vinyl aromatic compound and an α,β-unsaturated dicarboxylic acid anhydride contains 60–96 mole % of the vinyl aromatic compound, 2–30 mole % of the α,β-unsaturated dicarboxylic acid anhydride and 2–20 mole % of a methacrylate or an acrylate, and has a molecular weight in the range of 10,000–300,000.

9. The resin composition of claim 1, 2, 7 or 8 wherein the copolymer comprising a vinyl aromatic compound and an α,β-unsaturated dicarboxylic acid anhydride is a rubber-reinforced copolymer comprising a vinyl aromatic compound and an α,β-unsaturated dicarboxylic acid anhydride.

10. The resin composition of claim 1 or 2 wherein the copolymer comprising a vinyl aromatic compound and an imide compound of an α,β-unsaturated dicarboxylic acid contains 70–99 mole % of the vinyl aromatic compound and 1–30 mole % of the imide compound of an α,β-unsaturated dicarboxylic acid, and has a molecular weight in the range of 10,000–300,000.

11. The resin composition of claim 1 or 2 wherein the copolymer comprising a vinyl aromatic compound and an imide compound of an α,β-unsaturated dicarboxylic acid contains 70–98 mole % of the vinyl aromatic compound, 1–30 mole % of the imide compound of an α,β-unsaturated dicarboxylic acid and 1–20 mole % of a methacrylate or an acrylate, and has a molecular weight in the range of 10,000–300,000.

12. The resin composition of claim 1, 2, 10 or 11 wherein the copolymer comprising a vinyl aromatic compound and an imide compound of an α,β-unsaturated dicarboxylic acid is a rubber-reinforced copolymer comprising a vinyl aromatic compound and an imide compound of an α,β-unsaturated dicarboxylic acid.

13. The resin composition of claim 1 or 2 wherein the polyamide is polycaprolactam having a molecular weight in the range of 5,000–50,000.

14. The resin composition of claim 1 or 2 wherein the polyamide is polyhexamethyleneadipamide having a molecular weight in the range of 5,000–50,000.

15. The resin composition of claim 1 or 2 wherein the impact-resistant reinforcing agent is a graftcopolymer obtained by graft-copolymerization of monomers mainly composing a vinyl aromatic compound to a rubber-like polymer.

16. The resin composition of claim 15 wherein the graftcopolymer contains not less than 10 wt. % of the rubber-like polymer.

17. The resin composition of claim 1 or 2 wherein the impact-resistant reinforcing agent is one or more of styrene-butadiene block-copolymer, hydrogenated styrene-butadiene block-copolymer, ethylene-propylene elastomer, styrene-grafted-ethylene-propylene elastomer, polyester elastomer or ethylenic ionomer.

18. A thermoplastic resin composition which comprises the resin composition of claim 1 or 2 and additionally a polymer comprising a vinyl aromatic compound in not less than 80 wt. %.

19. The resin composition of claim 18 wherein the polymer comprising a vinyl aromatic compound in not less than 80 wt. % is polystyrene.

20. A thermoplastic resin composition which comprises the resin composition of claim 1 or 2 and additionally a phosphorous compound.

21. The resin composition of claim 20 wherein the phosphorous compound is a phosphoric ester or a phosphorous ester.

22. The resin composition of claim 20 wherein the phosphorous compound is one represented by the following general formulae (A) or (B):

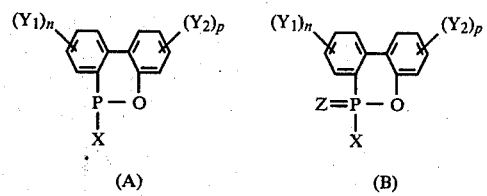

wherein X represents hydrogen, hydroxyl group, amino group, an alkyl group having 1–10 carbon atoms, an alkoxy group having 1–10 carbon atoms or an allyloxy group having 1–10 carbon atoms; $Y_1$ and $Y_2$ represent an alkyl group having 1–8 carbon atoms or an alkoxy group having 1–8 carbon atoms, respectively; Z represents oxygen or sulfur and n and p are integers of 0–4, respectively.

23. A highly heat-resistant glass fiber-reinforced resin composition which comprises the resin composition of claim 1 or 2 in 40–95 wt. % and glass fibers in 5–60 wt. %.

24. A carbon fiber-reinforced resin composition which comprises the resin composition of claim 1 or 2 in 40–95 wt. % and carbon fibers in 5–60 wt. %.

* * * * *